US011169813B2

(12) United States Patent
Yates et al.

(10) Patent No.: US 11,169,813 B2
(45) Date of Patent: Nov. 9, 2021

(54) POLICY HANDLING FOR DATA PIPELINES

(71) Applicant: Backbone Operations, Inc., San Francisco, CA (US)

(72) Inventors: Seth Yates, Danville, CA (US); Yacov Salomon, Danville, CA (US); Vivek Vaidya, San Francisco, CA (US)

(73) Assignee: Ketch Kloud, Inc., San Francisco, CA (US)

( * ) Notice: Subject to any disclaimer, the term of this patent is extended or adjusted under 35 U.S.C. 154(b) by 170 days.

(21) Appl. No.: 16/525,944

(22) Filed: Jul. 30, 2019

(65) Prior Publication Data
US 2021/0034372 A1 Feb. 4, 2021

(51) Int. Cl.
| | | |
|---|---|---|
| *G06F 9/38* | (2018.01) | |
| *G06F 15/76* | (2006.01) | |
| *G06F 9/44* | (2018.01) | |
| *G06F 9/4401* | (2018.01) | |
| *G06F 15/78* | (2006.01) | |
| *G06F 9/48* | (2006.01) | |

(52) U.S. Cl.
CPC .......... *G06F 9/3869* (2013.01); *G06F 9/3836* (2013.01); *G06F 9/4408* (2013.01); *G06F 9/4411* (2013.01); *G06F 9/4881* (2013.01); *G06F 15/7867* (2013.01); *G06F 15/7871* (2013.01); *G06F 15/7878* (2013.01)

(58) Field of Classification Search
CPC .... G06F 9/3836; G06F 9/3869; G06F 9/5038; G06F 9/5044; G06F 9/505; G06F 9/5055; G06F 9/4881; G06F 9/4806; G06F 9/4843; G06F 9/4856; G06F 9/4406; G06F 9/4408; G06F 9/441; G06F 9/4411; G06F 15/7867; G06F 9/7871; G06F 9/7878; G06F 9/7882; G06F 11/3072; G06F 11/3688
USPC .......... 712/225, 227; 718/100–108; 717/120, 717/121, 151, 153, 172, 173, 177, 178
See application file for complete search history.

(56) References Cited

U.S. PATENT DOCUMENTS

| | | | |
|---|---|---|---|
| 2008/0301670 A1* | 12/2008 | Gouge ...................... | G06F 8/60 717/173 |
| 2012/0192191 A1* | 7/2012 | Jellinek ................. | G06F 9/5044 718/102 |
| 2013/0219022 A1* | 8/2013 | Manivel ................ | G06F 9/5011 709/219 |
| 2018/0203744 A1* | 7/2018 | Wiesmaier ............ | G06F 9/4881 |

(Continued)

*Primary Examiner* — Daniel H Pan
(74) *Attorney, Agent, or Firm* — Holland & Hart LLP

(57) ABSTRACT

Methods, systems, and devices for data processing are described. In some systems, data pipelines may be implemented to handle data processing jobs. To improve data pipeline flexibility, the systems may use separate pipeline and policy declarations. For example, a pipeline server may receive both a pipeline definition defining a first set of data operations to perform and a policy definition including instructions for performing a second set of data operations, where the first set of data operations is a subset of the second set. The server may execute a data pipeline based on a trigger (e.g., a scheduled trigger, a received message, etc.). To execute the pipeline, the server may layer the policy definition into the pipeline definition when creating an execution plan. The server may execute the execution plan by performing a number of jobs using a set of resources and plugins according to the policy definition.

16 Claims, 12 Drawing Sheets

(56) References Cited

U.S. PATENT DOCUMENTS

2018/0316759 A1* 11/2018 Shen .................. H04L 67/1097
2018/0330107 A1* 11/2018 Gordon ................ G06F 21/604

* cited by examiner

POLICY HANDLING FOR DATA PIPELINES

FIELD OF TECHNOLOGY

The present disclosure relates generally to data processing, and more specifically to policy handling for data pipelines.

BACKGROUND

Systems supporting data processing may implement data pipelines to handle moving data, processing data, storing data, publishing data, or some combination of these or other data jobs. A user (e.g., a developer) may write code defining a data pipeline. However, the data pipeline definition may be specific to a particular implementation (e.g., a particular cloud, particular network devices and/or databases, etc.). If settings or constraints of the system change, the developer may need to redefine the data pipeline definition to handle the updated settings or constraints. Such changes to a data pipeline definition may be time consuming, and in some cases a developer may not be aware of the changes to the system requiring data pipeline updates. As such, changes to the system may result in inefficient or noncompliant handling of a system's data by the data pipeline.

DETAILED DESCRIPTION

Figure 1:
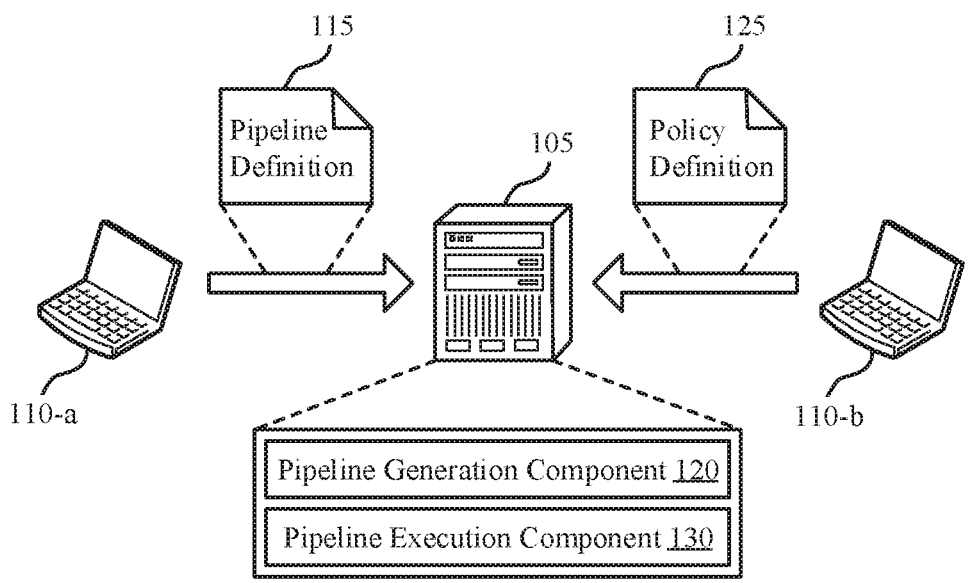
FIG. 1 illustrates an example of a system for data pipeline execution that supports policy handling for data pipelines in accordance with aspects of the present disclosure.

Some systems may support data pipelines to orchestrate data jobs, which may be referred to simply as jobs. For example, a data pipeline may indicate an order for performing jobs, which jobs to perform, how to handle failed jobs, how to perform the jobs, or some combination of these specifications. Data jobs may include extracting data, loading data, transforming data, combining data, storing data, validating data, publishing data, or some combination of these or other data processes. A user (e.g., a developer) may write code defining a data pipeline. However, the pipeline definition may be specific to a particular implementation (e.g., a particular cloud, particular network devices and/or databases, etc.). If the settings or constraints of a system implementing a data pipeline change, the developer may need to redefine the data pipeline to handle the updated settings or constraints. In some cases, redefining a data pipeline may be time consuming, resulting in inefficiencies within the system. Additionally or alternatively, a system administrator may modify the settings or constraints for the system, and a developer may not be aware of the changes to the system. As such, the developer may fail to correctly revise the data pipeline definition to meet the updated system parameters, resulting in a noncompliant data pipeline.

To improve the flexibility of data pipeline definitions, a system may implement separate pipeline and policy declarations. For example, a server (e.g., a pipeline server, which may be an example of an application server, a database server, a cloud server, a server cluster, a virtual machine, components of a user device, etc.) may receive both a pipeline definition defining a first set of data operations to perform (e.g., from a developer) and a policy definition including instructions for performing a second set of data operations (e.g., from an administrator), where the first set of data operations is a subset of the second set. The server may identify a trigger (e.g., a scheduled trigger, a received message, etc.) and may execute a pipeline based on the trigger. In order to execute the pipeline, the server may create an execution plan by layering the policy definition into the pipeline definition. The resulting execution plan may include data jobs specified by the pipeline definition that are performed according to resources, devices, plugins, and/or systems specified by the policy definition. The server may perform data processing according to the execution plan.

By implementing separate pipeline and policy definitions, the server may efficiently handle system updates. For example, an administrator may modify certain system settings or constraints (e.g., the administrator may switch a database used by the system based on a new system policy). Rather than redefine a data pipeline to integrate with the new policy, the administrator may update the policy definition with revised instructions that comply with the new policy. When the server next executes the data pipeline, the server may layer in the updated policy definition to create an updated execution plan. In this way, changes to the system policies may not affect the pipeline definitions implemented by the system. Furthermore, defining separate data pipelines and policies may support scheduling jobs across different platforms, across different clouds, and using different containers. In some cases, the data pipelines may be extensible via a robust plugin system, where plugins may be added, modified, and/or removed on-the-fly to handle interactions with new or modified systems, devices, or both.

Aspects of the disclosure are initially described in the context of a system for data pipeline handling. Additional aspects of the disclosure are described with reference to data pipeline processing and execution, as well as an architecture and process flow for data pipeline policy handling. Aspects of the disclosure are further illustrated by and described with reference to apparatus diagrams, system diagrams, and flowcharts that relate to policy handling for data pipelines.

FIG. 1 illustrates an example of a system 100 for data pipeline execution that supports policy handling for data pipelines in accordance with aspects of the present disclosure. The system 100 may include a server 105 that manages data pipeline execution. This server 105 may be referred to as a pipeline server and may be an example of an application server, a database server, a cloud server, a server cluster, a virtual machine, a container, a user device, or any combination of these or other devices or device components supporting data processing. One or more user devices 110 may interact with the server 105 in the system 100. A user device 110 may be an example of a personal electronic device such as a cellular phone, a personal digital assistant, a tablet computer, a laptop computer, a personal computer, a smart device, or any other user device providing an input/output (I/O) interface for a user. As illustrated, the server 105 may receive information from one or more user devices 110 in the system 100 in order to generate and execute a data pipeline. To execute the data pipeline, the server 105 may interact with any number of other processing devices, network devices, data storage devices, or a combination thereof (not shown) to receive, process, and/or store the specified data.

A data pipeline may automate the flow of data between different systems and/or devices. The data pipeline may be code (e.g., stored in a non-transitory, computer-readable medium) defining a set of processes or operations—referred to as data jobs or, simply, jobs—for managing data. These processes or operations may include extracting data, transforming data, loading data, validating data, combining and/or segmenting data, encrypting and/or decrypting data, displaying data, or any combination of these or other data processes. The data pipeline may specify which data jobs to perform, how to perform the data jobs, a sequence or order for performing the data jobs, error handling for failed data jobs (e.g., how many times to retry a data job, any changes to make in between retrying data jobs, etc.), or some combination of this information. Data pipelines may manage concurrent data streams from a variety of sources (e.g., real-time sources, data storage sources, etc.) and may utilize one or more techniques (e.g., batch techniques, real-time handling techniques, cloud-based techniques, etc.) to reduce processing latency and ensure accurate and consistent data handling. As such, an organization performing data processing at scale may utilize one or more data pipelines to define how the different data jobs managed by the organization are performed in order to produce a desired end result (e.g., successful and secure data storage, accurate data analytics, etc.).

In a conventional system, a user (e.g., a developer) may create a data pipeline definition that includes all information relevant to executing the data pipeline. However, to include all of the necessary information for execution, the data pipeline definition may be specific to a particular implementation (e.g., a particular cloud, particular network devices and/or databases, etc.). If any parameters of the implementation change (e.g., an organization switches data storage systems, security policies are updated, etc.), the developer may need to redefine the data pipeline to handle the updated system. Redefining a data pipeline may be time consuming, resulting in inefficiencies within the system due to the data pipeline definition's lack of robustness. Additionally or alternatively, a system administrator may modify the settings for the system, and a developer may not be aware of the changes to the system. As such, the developer may fail to correctly revise the data pipeline definition to meet the updated system parameters, resulting in a noncompliant data pipeline.

In contrast, the system 100 implements policy handling for data pipelines, supporting robust data pipelines that can efficiently update along with the system 100. In the system 100, users may declare a pipeline separate from the policies governing the pipeline. For example, the server 105 may receive a pipeline definition 115 decoupled from a policy definition 125. In some cases, a first user (e.g., operating first user device 110-*a*) may declare the pipeline definition 115 while a second user (e.g., operating second user device 110-*b*) may declare the policy definition 125. Each of these definitions may be transmitted to the server 105 for data pipeline execution. In other cases, a single user, single user device 110, or both may define the pipeline and policy definitions.

Based on the pipeline definition 115, the server 105 may create a pipeline using a pipeline generation component 120 (e.g., a processing component of the server 105). When triggered, the server 105 may perform data pipeline execution (e.g., using a pipeline execution component 130). At execution time, the server 105 may layer the policy definition 125, including the current policy declarations, in with the pipeline definition 115 to form an execution plan, where the server 105 performs the indicated data jobs according to the execution plan. Performing the data jobs may involve communicating with (e.g., retrieving data from, sending data to, etc.) one or more other servers 105, data storage systems, network devices, user device 110, or some combination of these. By implementing policy-driven pipeline execution, the server 105 may support flexible data pipeline definitions. For example, a same pipeline definition 115 may result in different execution plans based on the injected policy definition 125. In this way, a user (e.g., a system administrator, a user managing the system infrastructure, a user managing the system security, etc.) may update a policy definition 125 to meet any new or modified system requirements and/or preferences without updating the pipeline definition 115. The combination of the pipeline definition 115 and the policy definition 125 supports efficient, robust, and scalable data pipelines for a data processing system 100.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
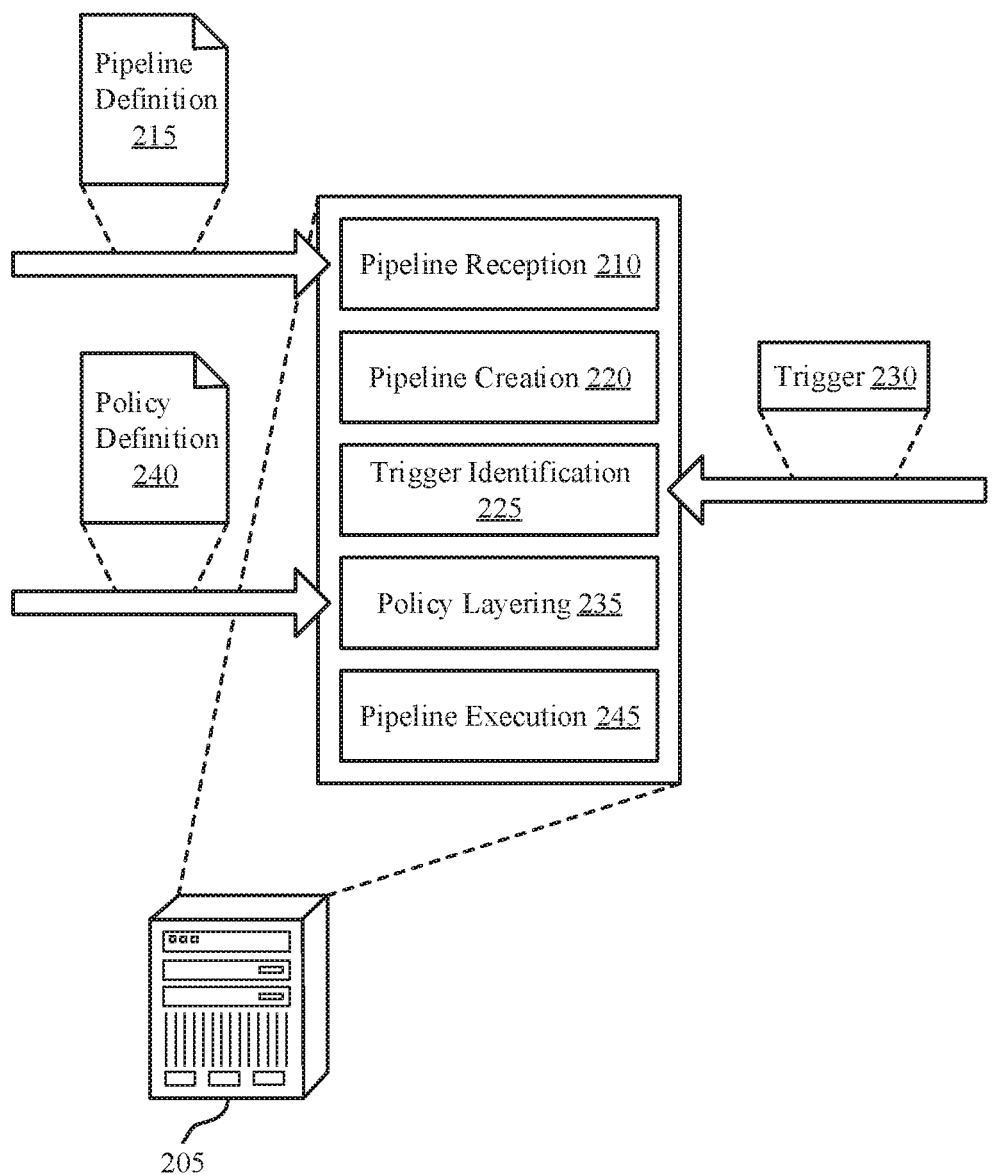
FIG. 2 illustrates an example of data pipeline processing that supports policy handling for data pipelines in accordance with aspects of the present disclosure.

FIG. 2 illustrates an example of data pipeline processing 200 that supports policy handling for data pipelines in accordance with aspects of the present disclosure. The data pipeline processing 200 may be performed by a server 205, which may be an example of the server 105 described with reference to FIG. 1. The server 205 may perform pipeline reception 210, pipeline creation 220, trigger identification 225, policy layering 235, pipeline execution 245, or some combination of these processes. In some cases, one or more of these processes may performed at various positions (e.g., physical locations), including being distributed such that portions of functions are implemented at different physical locations by one or more physical devices. In some examples, the server 205 and its various components may be a single device and/or system or may be separate and distinct devices and/or systems. For example, a cloud-based system may perform the processes described herein with respect to the server 205, where different processes may be performed across a variety of shared resources and cloud devices.

During pipeline reception 210, the server 205 may receive a pipeline definition 215. This pipeline definition 215 may be received from a user device (e.g., as described with reference to FIG. 1), received from another server 205, or installed locally at the server 205. In some cases, the pipeline definition 215 may be received via an application programming interface (API). The pipeline definition 215 may be an example of a domain-specific language (DSL) file written by a user (e.g., a developer). For example, the user may author the pipeline definition 215 as source code.

The pipeline definition 215 may be bundled and/or published by a user (e.g., using a user-facing application). Bundling and/or publishing the pipeline definition 215 may send the DSL file to the server 205 for processing. In some cases, the user may declaratively define the pipeline, and an application (e.g., running on the server 205, another server, the user's user device, etc.) may automatically generate the pipeline definition 215 (e.g., the DSL file) based on the declarative definition. For example, in a user interface of a user device, the user may drag-and-drop data jobs into a specific sequence or tree for execution, and backend processing (e.g., a pipeline management platform) may determine how to perform the data jobs and may generate a pipeline definition 215 (e.g., including a directed graph) based on the configuration of the jobs.

The server 205 may perform pipeline creation 220 to create a data pipeline based on the pipeline definition 215. In some cases, the pipeline definition 215 may include enough information to create an executable pipeline (e.g., the pipeline definition 215 may include default parameters in case a policy definition 240 is not provided). In other cases, the created pipeline may include placeholder values that can be defined based on a policy definition 240 at execution time. In yet other cases, the pipeline creation 220 may be performed at execution time (e.g., once a pipeline definition 215 and the corresponding policy definition 240 are both received).

The server 205 may monitor for a trigger 230 to execute the pipeline. In some examples, the pipeline definition 215 may specify the triggers 230 for that data pipeline. In some cases, a data pipeline may execute according to a schedule. For example, the trigger may be schedule-based (e.g., a periodic trigger or an aperiodic trigger) and may automatically fire according to the schedule. In other cases, a data pipeline may execute based on identifying an event. For example, an incoming message on a message queue (e.g., at the server 205) may trigger a data pipeline execution. In some examples, a user may select to execute a data pipeline (e.g., in a user interface), and the server 205 may receive an indication of the selection and perform the execution accordingly. This trigger identification 225 may support planning and executing the data pipeline. If the server 205 supports multiple data pipelines, a trigger 230 may be associated with a specific pipeline (e.g., based on a pipeline identifier, an organization identifier, a user identifier, etc.).

The server 205 may perform policy layering 235 at execution time. This policy layering 235 may be transparent to a user. During policy layering 235, the server 205 may prepare an execution plan for the data pipeline based on a policy definition 240. In some cases, based on the trigger 230, the server 205 may request a policy definition 240 from a user to perform the policy layering 235. In other cases, the server 205 may store a current policy definition 240 in memory and may retrieve the policy definition 240 from memory based on the trigger 230. A user may send an updated policy definition 240 to the server 205 to replace the current policy definition 240 in memory. For example, if settings or constraints for a system change (e.g., if the infrastructure for the system is updated), the system administrator may update the policy definition 240 and submit the updated policy definition 240 to the server 205. Similar to the pipeline definition 215, the policy definition 240 may be an example of a DSL file. Additionally or alternatively, users may generate policy definitions 240 declaratively. That is, a user may select one or more policies or configurations in a user interface, and backend processes may generate a corresponding DSL file with instructions, constraints, and/or override values corresponding to the user selected policies. The policy DSL file may support a specific variant of a pipeline by defining the boundaries for that specific pipeline variant. The DSL files for the policy definition 240 and the pipeline definition 215 may be processed concurrently to create an execution plan based on the pipeline definition 215 logic and the selections and/or instructions of the policy definition 240. In some cases, a portion of the instructions from the policy definition 240 may override information in the pipeline definition 215 (e.g., to meet system preferences or requirements).

Using the generated execution plan, the server 205 may perform pipeline execution 245. The server 205 may perform data jobs in sequence using parameters as configured in the execution plan. For example, the execution plan may arrange data jobs (e.g., activities) in a directed graph for processing, and the execution plan may indicate resources (e.g., a single node, a node cluster, etc.) to perform the activities in the directed graph. An activity may be performed according to the available and/or allocated resources and may be based on one or more preconditions, one or more services (e.g., a database service, a metadata service, etc.), or some combination thereof. In some cases, to perform the specified jobs, the server 205 may use one or more plugins.

Figure 3:
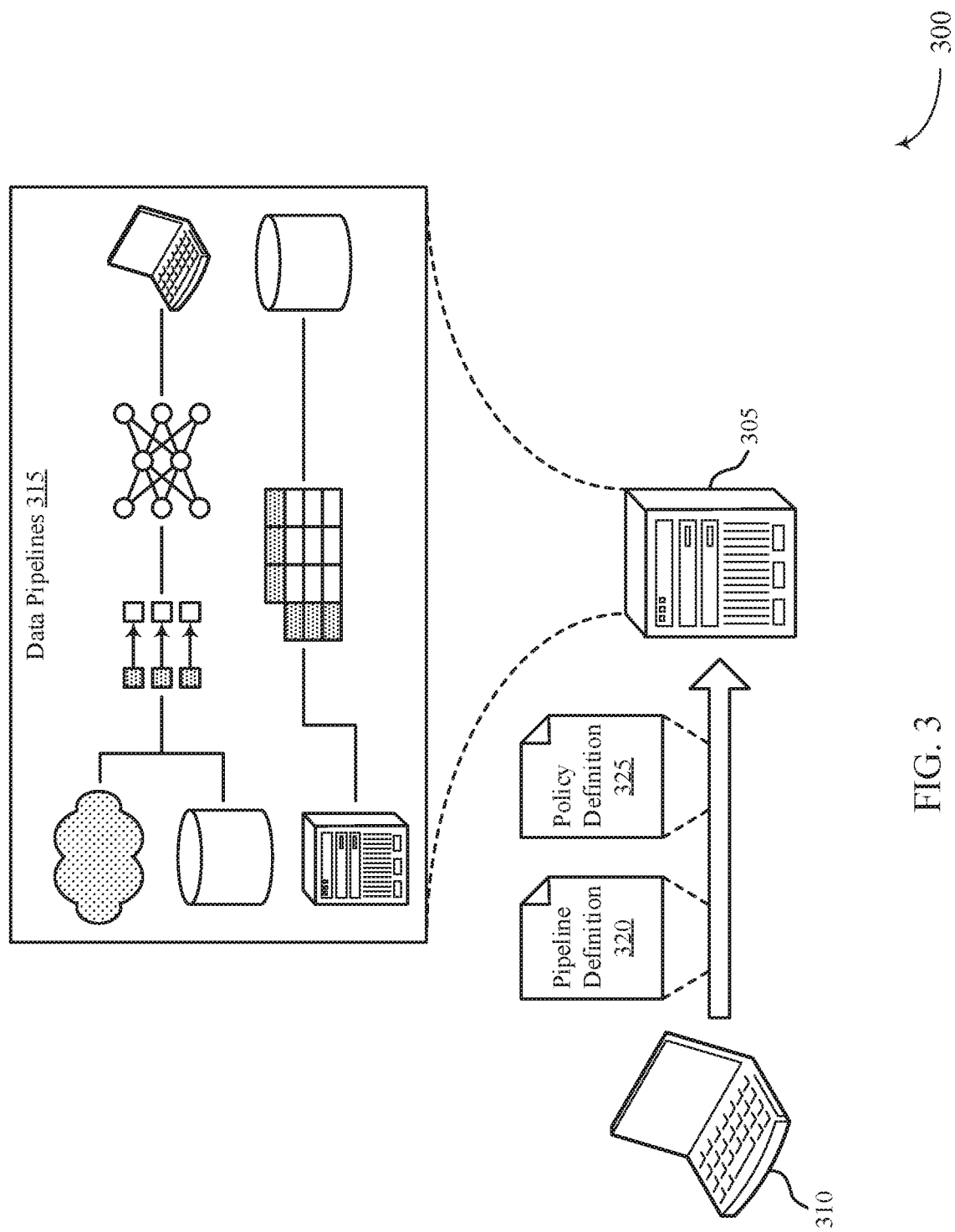
FIG. 3 illustrates an example of data pipeline execution that supports policy handling for data pipelines in accordance with aspects of the present disclosure.

FIG. 3 illustrates an example of data pipeline execution 300 that supports policy handling for data pipelines in accordance with aspects of the present disclosure. A server 305, such as a server described with reference to FIGS. 1 and 2, may perform the data pipeline execution 300. The server 305 may receive a pipeline definition 320 and a policy definition 325 from one or more user devices 310, as described herein with reference to FIGS. 1 and 2. Using these definitions, the server 305 may create an execution plan for a data pipeline 315. In some cases, the server 305 may additionally receive one or more plugin definitions, where each plugin may support managing resources, running tasks, or both. The plugins may connect the server 305 to one or more devices in the data pipeline 315.

Data pipelines 315 may include a number of data jobs and devices. A data pipeline 315 may configure what data jobs to perform, when to perform them, and how to perform them. One exemplary data pipeline 315 may extract data from a cloud-based storage system and a database (e.g., a relational database) and may combine the data into an aggregate data set. A processing device in the data pipeline 315 may analyze the aggregate data set (e.g., using machine-learning techniques) and prepare the data analysis results for display. The data pipeline 315 may load the analysis results on a user device for display in a user interface. In some cases, the data pipeline may support one or more techniques for reducing latency at any step in the process. Additionally or alternatively, the data pipeline may support reducing processing overhead (e.g., total overhead and/or instantaneous overhead) using one or more techniques. For example, the data may be retrieved and processed in batches (e.g., of a pre-configured or dynamic size) to reduce processing resources utilized at any moment in time for the pipeline execution. Another exemplary data pipeline 315 may involve retrieving data from a server (e.g., in real-time as data is passed to the server), transforming the data to form a table in memory, formatting the table to be compatible with a specific database, and storing the table in the database. It is to be understood that the server 305 may support any other types of data pipelines 315 using the decoupled pipeline definition 320 and policy definition 325 configuration.

Combining the pipeline definition 320 with the policy definition 325 at execution time may define the data jobs of a data pipeline 315 and instruct how to perform these data jobs. For example, the pipeline definition 320 may indicate what the server 305 will do to the data, while the policy definition 325 may indicate the supported processes and/or devices that may carry out these jobs. In the first exemplary data pipeline 315 described above, the pipeline definition 320 may define a job involving extracting data from a set of storage devices, a job involving combining the extracted data, and a job involving preparing the data for display. The policy definition 325 may define the specific data sources for an organization (e.g., a specific cloud, a specific database or type of database, etc.), the devices to perform the data aggregation, and how the data may be displayed (e.g., a policy specifying particular data fields to hide, particular data fields to encrypt and/or decrypt, etc.). In this way, if the policies for an organization change (e.g., the organization migrates its data to a new data storage system, the organization implements new client privacy features, etc.), a user may update the policy definition 325 (or the policy definition 325 may be automatically updated based on the policy changes) without affecting the pipeline definition 320. Layering in the updated policy definition 325 to the same pipeline definition 320 may result in an updated data pipeline 315 that performs the same (or similar) data jobs in different ways (e.g., using different devices, different constraints, etc.).

Figure 4:
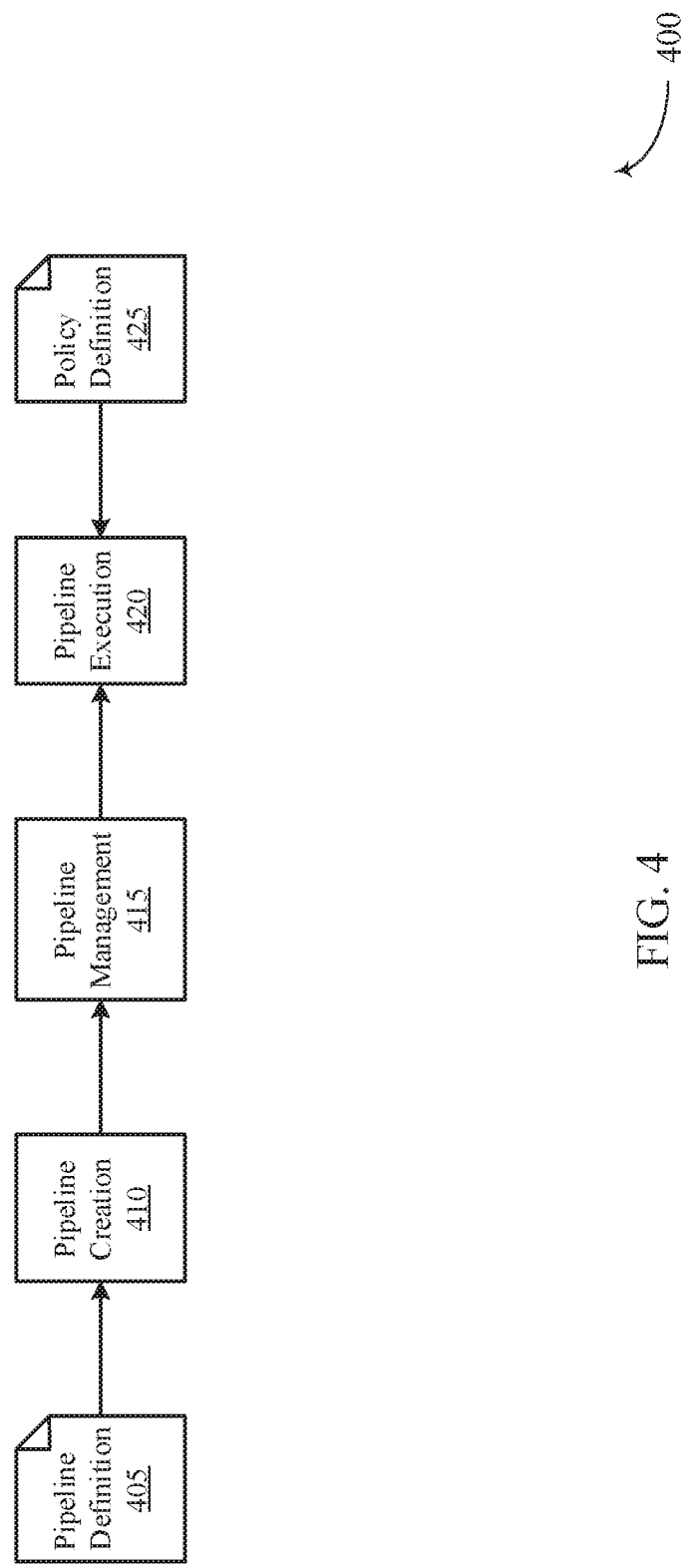
FIG. 4 illustrates an example of data pipeline processing that supports policy handling for data pipelines in accordance with aspects of the present disclosure.

FIG. 4 illustrates an example of data pipeline processing 400 that supports policy handling for data pipelines in accordance with aspects of the present disclosure. The data pipeline processing 400 may be performed by a pipeline server, such as a server described with reference to FIGS. 1 through 3. In some cases, the data pipeline processing 400 may be supported by an application (i.e., a data pipeline application). A user or group of users (e.g., an organization) may run the application to define and execute data pipelines with flexible policy handling.

A policy-driven data pipeline application may include a command-line interface (CLI), a registry, and a host server. In some cases, one or more of these components of the application may be downloaded to run locally on a user device. In other cases, one or more of these components may run on the backend (e.g., on a web server, on a cloud server, etc.). The CLI may support a number of commands for managing and executing data pipelines. Some example commands may include, but are not limited to: doc, to show documentation; fmt, to format source files; validate, to validate source files; graph, to output a graph description of a pipeline; get, to download a module or plugin from a registry; publish, to publish a module or plugin to a registry; plan, to create an execution plan for a pipeline; and run, to run an execution plan for a pipeline. The registry (e.g., a local registry at a user device) may host one or more modules, one or more plugins, or both. The server (e.g., a local server) may host pipelines, triggers, or both. These pipelines and triggers may be examples of user-defined pipelines and triggers, where a user may declaratively define the pipelines and/or triggers in a user interface of the application.

The data pipeline application may support scheduling of any workflow on any platform (e.g., out-of-the-box). For example, the application may use pipeline definitions to support an extensible list of data jobs (e.g., where a workflow is an ordered set of data jobs), while using policy definitions to support an extensible list of platforms based on the flexible policies. Additionally or alternatively, the application may support pipelines-as-code, where a user may declaratively define a pipeline code file, a policy code file, or both using high-level expression in a user interface. For example, the user may define a set of activities for the pipeline to perform, and underlying code (e.g., using natural language processing (NLP) techniques, aggregation techniques, etc.) may generate a pipeline file, a policy file, or both based on the declarative definition. In some cases, the application may include different interfaces for generating pipeline definitions 405 and policy definitions 425. For example, the application may include a single data pipeline user interface or may include a separate pipeline user interface (e.g., for developers) and policy user interface (e.g., for system administrators). In some cases, these separate user interfaces may be run by different applications.

The data pipeline application may additionally or alternatively support a robust plugin system. The plugin system may be extensible to include additional plugins and/or modified plugins (e.g., to support interactions with any cloud, container, etc.). For example, the application may include a plugin registry that supports handling of different programming languages, different network devices, different data processes, or any combination of these. The application may be cloud-agnostic (e.g., not tied to a particular cloud), container-native, or both (e.g., based on the supported plugins). For example, the application may handle data from any cloud-based system and any data storage system using any combination of devices (e.g., designed to run in a container, that may be a component of a physical machine, a virtual machine, or both). The application may support processing (e.g., backend processing) on a pipeline server to deploy and execute user-defined data pipelines.

In some cases, the application may be packaged differently for different groups of users. For example, organizations may license use of the application, and different licensing agreements may support different features of the application. Some versions of the application may include additional support for managing pipelines and/or users, setting security features, storing private information (e.g., pipelines, triggers, plugins, modules, etc.), audit logging, policy handling, or some combination of these or other pipeline handling features.

As illustrated in FIG. 4, a user may define a pipeline definition 405. A system (e.g., a host server storing pipelines for the user) may perform pipeline creation 410 and may support pipeline management 415. In pipeline management 415, the user may manage the creation of a pipeline (e.g., pause the pipeline creation 410, inspect the pipeline creation 410, etc.), view the created pipeline, validate the jobs defined for the pipeline, and/or update the pipeline definition 405 to modify the pipeline. Based on a trigger, the system may perform pipeline execution 420. In some cases, pipeline execution 420 may involve transmitting the created pipeline to a pipeline server, along with a policy definition 425 (e.g., a user-defined policy definition 425, an automatically generated policy definition 425, etc.). To execute the pipeline, the system may create an execution plan using the created pipeline and the defined policy. In some cases, executing the execution plan may involve a resource manager (e.g., to handle container-based resource allocation, cloud-based resource allocation, etc.), a task runner (e.g., to handle data jobs across one or more devices), or both. The resource manager, the task runner, their plugins, or some combination of these may be defined by the declared policies. In some cases, executing the pipeline may involve cascading through an execution plan (e.g., based on one or more DSL file definitions) to run the defined set of jobs.

A resource manager may handle processing resources for executing the data pipeline. The resource manager may include a number of plugins to manage the resources for executing data jobs. Example resource manager plugins may automate deployment, scaling, and management of applications in container environments (e.g., using Kubernetes), provide secure, scalable compute capacity in cloud environments, support scalable, low-latency data processing in cloud or data storage environments, or provide some combination of these or other resource management processes. In some cases, the resource manager may monitor resource usage during pipeline execution (e.g., processing resources, time resources, etc.) and may halt the pipeline execution if the resource usage exceeds a static or dynamic resource usage threshold.

A task runner may handle executing data jobs (e.g., managing the flow of data through any number of processes and/or transformations). The task runner may include a number of plugins to handle executing the data jobs. Example task runner plugins may process data (e.g., stream data, query data, analyze data, display data, etc.) at scale using batches, in real-time or pseudo-real-time using continually running processes, in a coordinated, distributed environment across one or more clusters of computers, or using some combination of these or other data processing techniques. Other example task runner plugins may handle launching web services or performing other web-based processes. In some cases, a data pipeline application may support a set of default plugins, as well as a set of user-definable and/or downloadable plugins to handle additional tasks, resources, or both.

Figure 5:
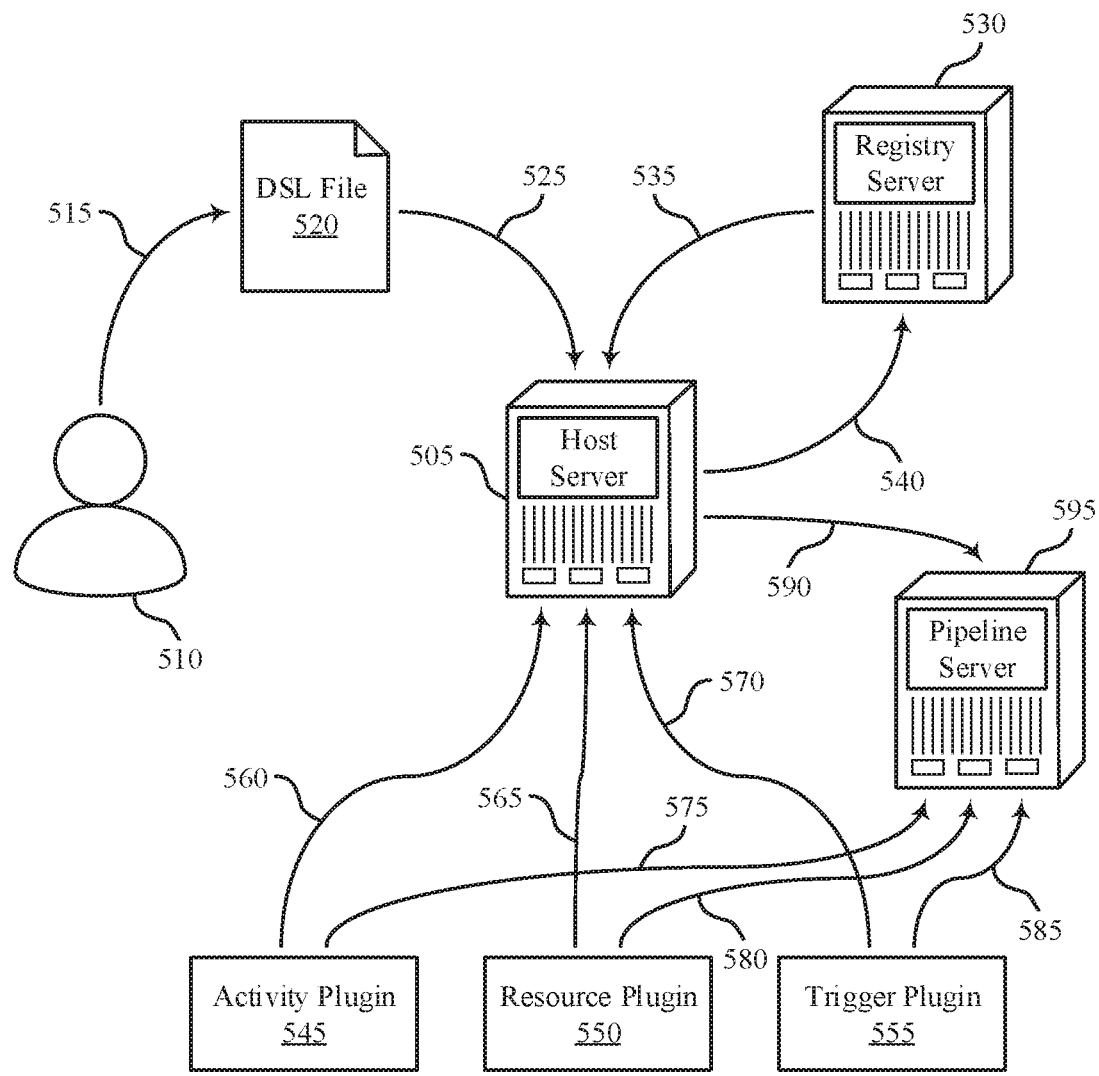
FIG. 5 illustrates an example of an architecture that supports policy handling for data pipelines in accordance with aspects of the present disclosure.

FIG. 5 illustrates an example of an architecture 500 that supports policy handling for data pipelines in accordance with aspects of the present disclosure. The architecture 500 may include a host server 505, a registry server 530, and a pipeline server 595. These servers may be examples of application servers, database servers, cloud servers, server clusters, virtual machines, containers, local components at a user device, or some combination of these or other processing components. For example, the host server 505 and registry server 530 may be local services running on a user device (e.g., downloaded as part of a data pipeline application as described with reference to FIG. 4) or web services running on a web server (e.g., where the data pipeline application is provided as software as a service (SaaS)). The pipeline server 595 may be an example of a server 105, 205, or 305 as described with reference to FIGS. 1 through 3, and may run as a service locally at a user device or may run on the backend to perform data pipeline execution (e.g., as a background process). In some cases, the servers may interact with each other and/or user devices via APIs.

A user 510 may author a DSL file 520 at 515. Authoring the DSL file 520 may involve declaratively defining a pipeline, a set of policies, or a combination thereof in a user interface of a user device (e.g., using a CLI). For example, the user device may run a data pipeline application supporting the CLI and including a local host server 505 storing pipeline and trigger information and a local registry server 530 storing plugin and module information. The user 510 may author a pipeline definition DSL file 520, a policy definition DSL file 520, or both. Using the data pipeline CLI, at 525, the user may validate and store the DSL file 520 at the host server 505. Additionally or alternatively, at 540, the user 510 may publish the DSL file 520 (or a pipeline created by the DSL file 520) to the registry server 530. In some cases, publishing to the registry may involve packaging one or more DSL files 520 (e.g., defining the pipeline structure, the triggers, one or more plugins, the current policies, or some combination of these) into a module for reuse, and publishing the packaged module. The user 510 may download modules (e.g., created and registered by other users 510) from the registry server 530 to the host server 505 at 535.

At 590, the host server 505 may submit a data pipeline to the pipeline server 595 for creation and execution. In some cases, the host server 505 may submit a corresponding pipeline when the host server 505 identifies a trigger for the data pipeline. For example, the host server 505 may use one or more trigger plugins 555 to monitor for pipeline execution triggers (e.g., schedule-based triggers, message-based triggers, user-based triggers, system-based triggers, policy-based triggers, etc.). Submitting the data pipeline to the pipeline server 595 may involve sending the DSL files 520 for the data pipeline, the packaged module for the data pipeline, or both to the pipeline server 595. The pipeline server 595 may use this information to create, manage, and execute a data pipeline.

The host server 505, the pipeline server 595, or both may interact with a number of plugins to perform tasks (e.g., via activity plugins 545), manage resources (e.g., via resource plugins 550), and monitor triggers (e.g., via trigger plugins 555). In some cases, the host server 505 may use one or more activity plugins 545 at 560, one or more resource plugins 550 at 565, and/or one or more trigger plugins 555 at 570 to package modules for publishing. Additionally or alternatively, the pipeline server 595 may use one or more activity plugins 545 at 575, one or more resource plugins 550 at 580, and/or one or more trigger plugins 555 at 585 to trigger execution and perform data jobs.

As a specific example, the user 510 may be a system administrator for an organization who formats, validates, and stores a policy DSL file 520. If the system administrator identifies that the organization no longer works with a certain client (e.g., an infrastructure management company), the system administrator may update the policy DSL file 520 to operate on different infrastructure that is not tied to the client. On the backend, one or more servers may inject this updated policy into an existing pipeline definition to handle moving away from the client's infrastructure without a user (e.g., a developer) rewriting the pipeline definition. In another example, the system administrator may specify a set of instances on which the data pipeline may run. In yet other examples, the system administrator may specify what data storage systems to use/not use, which data processes to use/not use, which resources to use/not use, or some combination of these or other policy parameters.

Figure 6:
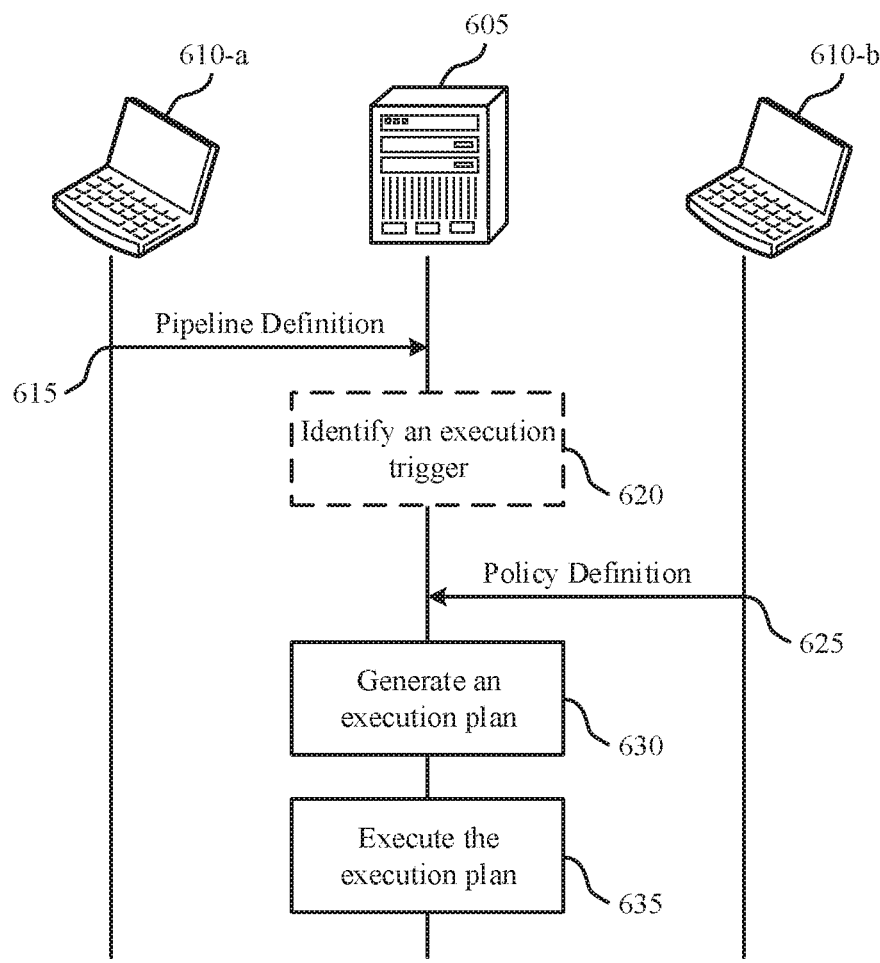
FIG. 6 illustrates an example of a process flow that supports policy handling for data pipelines in accordance with aspects of the present disclosure.

FIG. 6 illustrates an example of a process flow 600 that supports policy handling for data pipelines in accordance with aspects of the present disclosure. The process flow 600 may illustrate an example data pipeline execution scheme supporting policy-driven data processing. A server 605 (e.g., a pipeline server) may perform data pipeline execution based on files received from one or more user devices 610. For example, the server 610 may receive a file defining a pipeline from a first user device 610-*a* operated by a first user (e.g., a developer) and may receive a file defining a policy from a second user device 610-*b* operated by a second user (e.g., a system administrator). In some cases, the server 605 may receive both of these definitions from a same user device 610 and/or a same user. These files may be received separately by the server 605 or packaged together in a module. Alternative examples of the following may be implemented, where some steps are performed in a different order than described or are not performed at all. In some cases, steps may include additional features not mentioned below, or further steps may be added.

At 615, the server 605 may receive a pipeline definition from a user device 610 (e.g., user device 610-*a*). The pipeline definition may include a first set of data operations to perform. In some examples, this first set of data operations may include monitoring for data, transforming data, processing data, extracting data, loading data, or a combination thereof. Additionally, in some cases, the pipeline definition may indicate one or more triggers for executing the pipeline.

At 620, the server 605 may identify an execution trigger for the data pipeline. For example, the server 605 may identify a trigger of the one or more triggers included in the pipeline definition. The identified trigger may be an example of a schedule-based trigger, a data-based trigger, or some combination of these.

At 625, the server 605 may receive a policy definition from a user device 610. In some cases, the policy definition may be received from a user device 610-*b* different from the user device 610-*a*. For example, a developer using the first user device 610-*a* may input the pipeline definition, while an administrator using the second user device 610-*b* may declare the policy definition. In other cases, the pipeline definition and the policy definition may be received from a same user device 610. In some examples, the server 605 may request the policy definition based on a trigger. If the server 605 identifies a pipeline execution trigger but does not identify a policy definition for the given pipeline (or identifies an out-of-date policy definition), the server 605 may retrieve the policy definition from the user device 610 (e.g., by requesting submission of an up-to-date policy definition for the pipeline). The policy definition may include a set of instructions for performing a second set of data operations. The first set of data operations may be a subset of the second set of data operations or may be the same as the second set of data operations.

At 630, the server 605 may generate an execution plan based on the pipeline definition and the policy definition. The server 605 may layer the policy from the policy definition into the logic of the data pipeline defined by the pipeline definition to create the execution plan. For example, the pipeline definition may indicate a set of options for performing the first set of data operations, and the server 605 may select an option from the set of options based on the instructions in the policy definition. At 635, the server 605 may execute the execution plan by performing the first set of data operations specified in the pipeline definition according to the instructions specified in the policy definition. This may involve performing data operations of the first set of data operations in sequence, in parallel, or in some combination thereof based on the pipeline definition.

In some cases, generating the execution plan may involve the server 605 identifying a network device for performing at least one data operation of the first set of data operations based on the pipeline definition and the policy definition. In a first example, the pipeline definition may indicate a first network device to perform the data operation, while the policy definition may indicate a second network device different from the first network device. The policy definition may override the pipeline definition, and the server 605 may use the second network device (i.e., the device defined in the policy definition) to perform the data operation during execution. In a second example, the pipeline definition may indicate a network device type for performing at least one data operation, and the policy definition may indicate a specific network device of the network device type to implement for the data operation. Executing the execution plan may involve running a portion of code on the network device to perform the data operation assigned to the identified network device.

In some cases, the instructions specified in the policy definition may include one or more constraints for executing the data pipeline. In a first example, the instructions may indicate a data type constraint for pipeline execution. In this example, the server 605 may determine whether data intended for the pipeline corresponds to the data type of the data type constraint (e.g., one or more valid data types specified in the policy definition) and may extract the data if it corresponds to the data type. In a second example, the instructions may indicate a data storage constraint (e.g., a specific data storage system or type of data storage system) for pipeline execution. In this example, for a data storage process in the data pipeline, the server 605 may store data in the indicated specific data storage system or in a data storage system of the indicated type. In a third example, the instructions may indicate a resource constraint for execution of the data pipeline. In this example, the server 605 may halt execution of the data pipeline if a resource usage for executing the data pipeline meets or exceeds the specified resource constraint.

In some implementations, the server 605 may receive an updated pipeline definition and/or policy definition from one or more user devices 610. In these implementations, the server 605 may regenerate the execution plan using the updated files and may execute the regenerated execution plan (e.g., based on an execution trigger).

Figure 7:
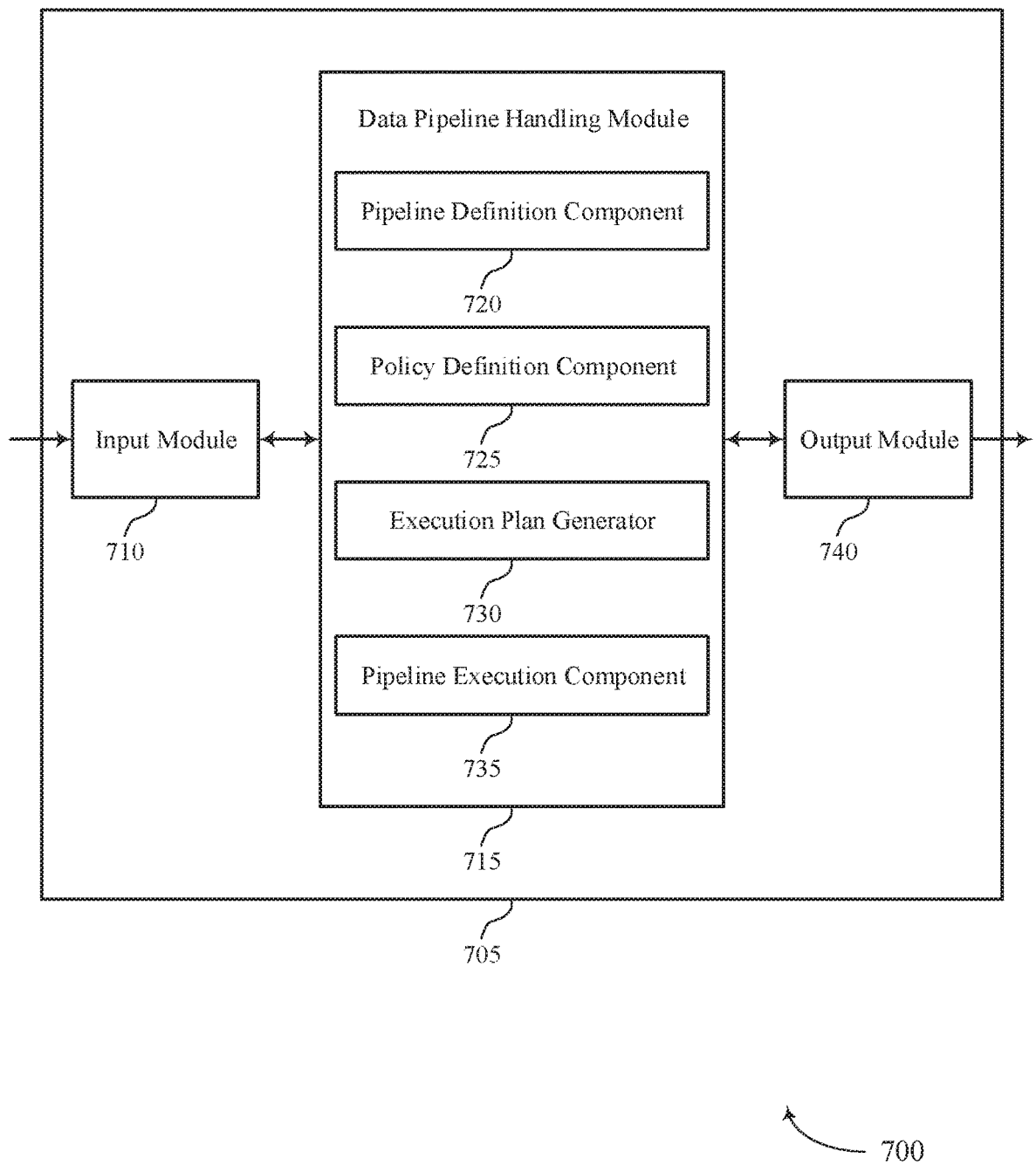
FIG. 7 shows a block diagram of an apparatus that supports policy handling for data pipelines in accordance with aspects of the present disclosure.

FIG. 7 shows a block diagram 700 of an apparatus 705 that supports policy handling for data pipelines in accordance with aspects of the present disclosure. The apparatus 705 may include an input module 710, a data pipeline handling module 715, and an output module 740. The apparatus 705 may also include a processor. Each of these components may be in communication with one another (e.g., via one or more buses). In some cases, the apparatus 705 may be an example of a user device, a server (e.g., an application server, a database server, a server cluster, a host or pipeline server, a virtual machine, etc.), or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the data pipeline handling module 715 to support policy handling for data pipelines. In some cases, the input module 710 may be a component of an I/O controller 915 as described with reference to FIG. 9.

The data pipeline handling module 715 may include a pipeline definition component 720, a policy definition component 725, an execution plan generator 730, and a pipeline execution component 735. The data pipeline handling module 715 may be an example of aspects of the data pipeline handling module 805 or 910 described with reference to FIGS. 8 and 9.

The data pipeline handling module 715 and/or at least some of its various sub-components may be implemented in hardware, software executed by a processor, firmware, or any combination thereof. If implemented in software executed by a processor, the functions of the data pipeline handling module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data pipeline handling module 715 and/or at least some of its various sub-components may be physically located at various positions, including being distributed such that portions of functions are implemented at different physical locations by one or more physical devices. In some examples, the data pipeline handling module 715 and/or at least some of its various sub-components may be a separate and distinct component in accordance with various aspects of the present disclosure. In other examples, the data pipeline handling module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data pipeline handling module 715 may be a component of a server. The pipeline definition component 720 may receive, at the server, a pipeline definition including a first set of data operations to perform. The policy definition component 725 may receive, at the server, a policy definition including instructions for performing a second set of data operations, where the first set of data operations is a subset of the second set of data operations. The execution plan generator 730 may generate an execution plan based on the pipeline definition and the policy definition. The pipeline execution component 735 may execute the execution plan, where the executing includes performing the first set of data operations according to the instructions.

The output module 740 may manage output signals for the apparatus 705. For example, the output module 740 may receive signals from other components of the apparatus 705, such as the data pipeline handling module 715, and may transmit these signals to other components or devices. In some specific examples, the output module 740 may transmit output signals for display in a user interface, for storage in a database or data store, for further processing at a server or server cluster, or for any other processes at any number of devices or systems. In some cases, the output module 740 may be a component of an I/O controller 915 as described with reference to FIG. 9.

Figure 8:
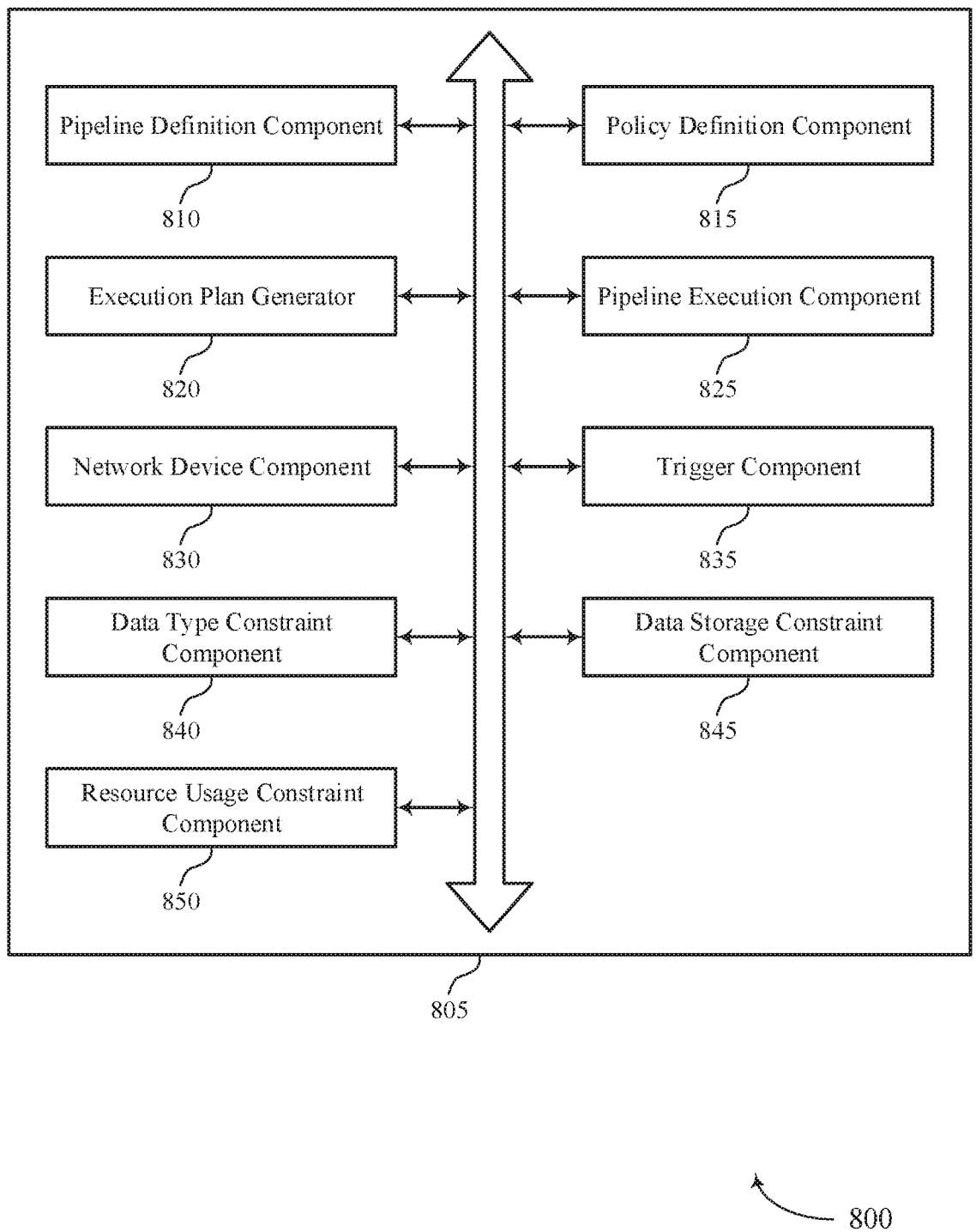
FIG. 8 shows a block diagram of a data pipeline handling module that supports policy handling for data pipelines in accordance with aspects of the present disclosure.

FIG. 8 shows a block diagram 800 of a data pipeline handling module 805 that supports policy handling for data pipelines in accordance with aspects of the present disclosure. The data pipeline handling module 805 may be an example of aspects of a data pipeline handling module 715 or a data pipeline handling module 910 described herein. The data pipeline handling module 805 may include a pipeline definition component 810, a policy definition component 815, an execution plan generator 820, a pipeline execution component 825, a network device component 830, a trigger component 835, a data type constraint component 840, a data storage constraint component 845, and a resource usage constraint component 850. Each of these modules may communicate, directly or indirectly, with one another (e.g., via one or more buses). The data pipeline handling module 805 may be a component of a server.

The pipeline definition component 810 may receive, at the server, a pipeline definition including a first set of data operations to perform. In some cases, the first set of data operations includes monitoring for data, transforming data, processing data, extracting data, loading data, or a combination thereof. In some cases, the pipeline definition is received from a first user device.

The policy definition component 815 may receive, at the server, a policy definition including instructions for performing a second set of data operations, where the first set of data operations is a subset of the second set of data operations. In some cases, the policy definition is received from a second user device different from the first user device. The first set of data operations and the second set of data operations may be the same.

The execution plan generator 820 may generate an execution plan based on the pipeline definition and the policy definition. In some examples, generating the execution plan may involve the execution plan generator 820 identifying a set of options indicated by the pipeline definition for performing the first set of data operations and selecting an option from the set of options based on the policy definition.

The pipeline execution component 825 may execute the execution plan, where the executing includes performing the first set of data operations according to the instructions. In some examples, the executing involves the pipeline execution component 825 performing a set of data operations of the first set of data operations in sequence, in parallel, or in a combination thereof based on the pipeline definition.

In some examples, the policy definition component 815 may receive, at the server, an additional policy definition including additional instructions for performing a third set of data operations, where the first set of data operations is a subset of the third set of data operations. In some of these examples, the execution plan generator 820 may regenerate the execution plan based on the pipeline definition and the additional policy definition, and the pipeline execution component 825 may execute the regenerated execution plan by performing the first set of data operations according to the additional instructions.

In some cases, generating the execution plan may involve the network device component 830 identifying a network device for performing at least one data operation of the first set of data operations based on the pipeline definition and the policy definition. In some examples, this network device may be a first network device and the pipeline definition may indicate a second network device (e.g., a default network device) for performing the at least one data operation that is different from the first network device. In some of these examples, the network device component 830 may override the indication of the second network device by the pipeline definition based on the policy definition. In some examples, the network device component 830 may determine a network device type indicated by the pipeline definition for performing the at least one data operation, where the network device is identified based on the network device type indicated by the pipeline definition and the policy definition. Additionally or alternatively, in some examples, executing the execution plan may involve the network device component 830 running a portion of code on the identified network device based on the execution plan, where the portion of code performs the at least one data operation of the first set of data operations.

In some examples, the pipeline definition may specify one or more triggers. The trigger component 835 may identify a trigger of the one or more triggers, where the execution plan is executed based on the identified trigger. In some cases, the execution plan may be generated based on the identified trigger, where the trigger component 835 may transmit a request for the policy definition based on the identified trigger, and the policy definition is received based on the request. In some cases, the identified trigger may be an example of a periodic trigger, a data-based trigger, or a combination thereof.

In a first example, the instructions may include a data type constraint. In this first example, the executing may involve the data type constraint component 840 determining whether data corresponds to a data type of the data type constraint and extracting the data if the data is determined to correspond to the data type of the data type constraint.

In a second example, the instructions may include a data storage constraint. In this second example, the generating the execution plan may involve the data storage constraint component 845 identifying a data storage system corresponding to the data storage constraint, and the executing may involve the data storage constraint component 845 storing data in the data storage system based on the execution plan.

In a third example, the instructions may include a resource constraint for execution. In this third example, the executing may involve the resource usage constraint component 850 halting the executing based on a resource usage for the executing meeting or exceeding the resource constraint.

Figure 9:
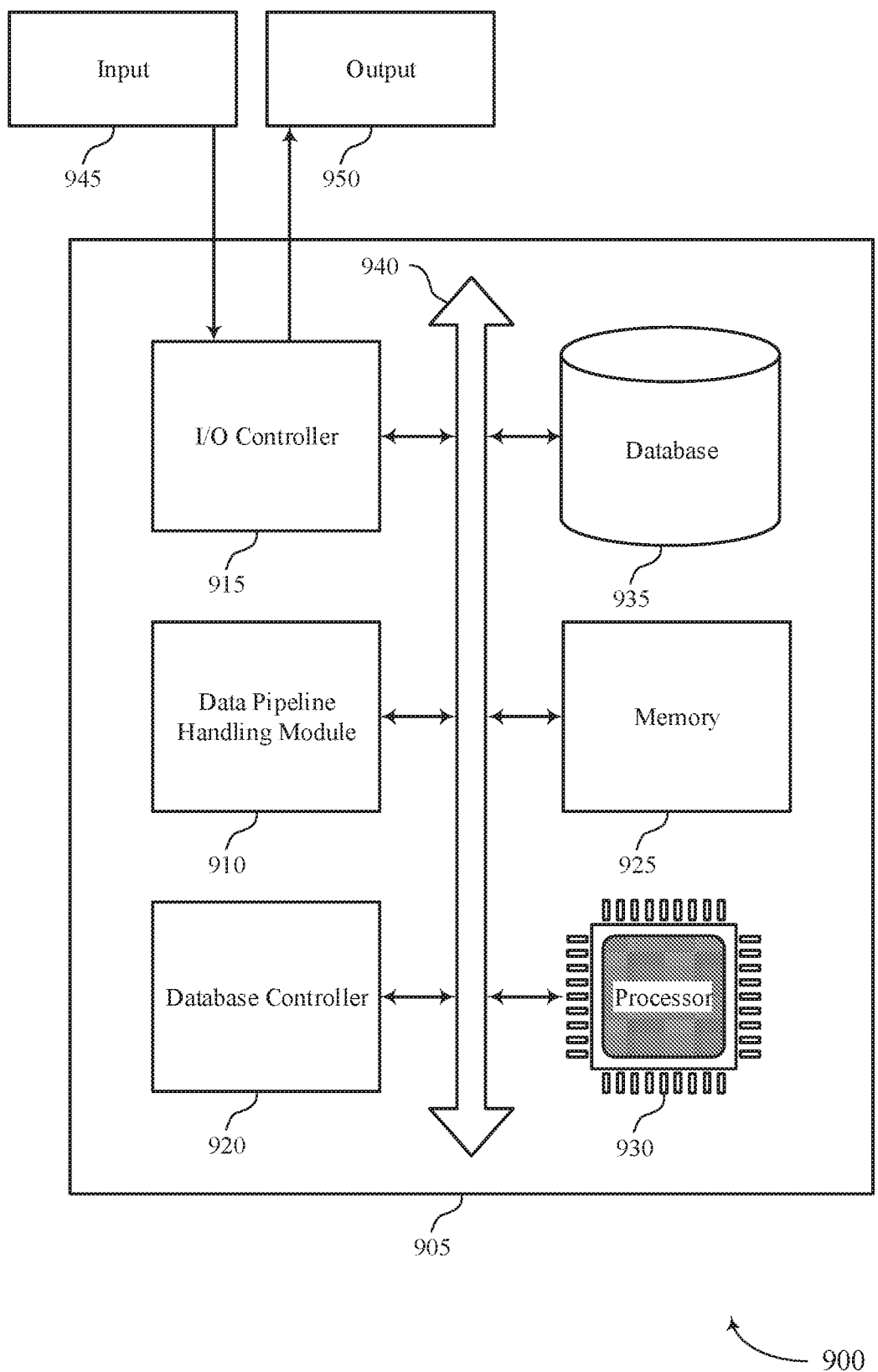
FIG. 9 shows a diagram of a system including a device that supports policy handling for data pipelines in accordance with aspects of the present disclosure.

FIG. 9 shows a diagram of a system 900 including a device 905 that supports policy handling for data pipelines in accordance with aspects of the present disclosure. The device 905 may be an example of or include the components of a server or an apparatus 705 as described herein. The device 905 may include components for bi-directional data communications including components for transmitting and receiving communications, including a data pipeline handling module 910, an I/O controller 915, a database controller 920, memory 925, a processor 930, and a database 935. These components may be in electronic communication via one or more buses (e.g., bus 940).

The data pipeline handling module 910 may be an example of a data pipeline handling module 715 or 805 as described herein. For example, the data pipeline handling module 910 may perform any of the methods or processes described above with reference to FIGS. 7 and 8. In some cases, the data pipeline handling module 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a disk on the device 905, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting policy handling for data pipelines).

Figure 10:
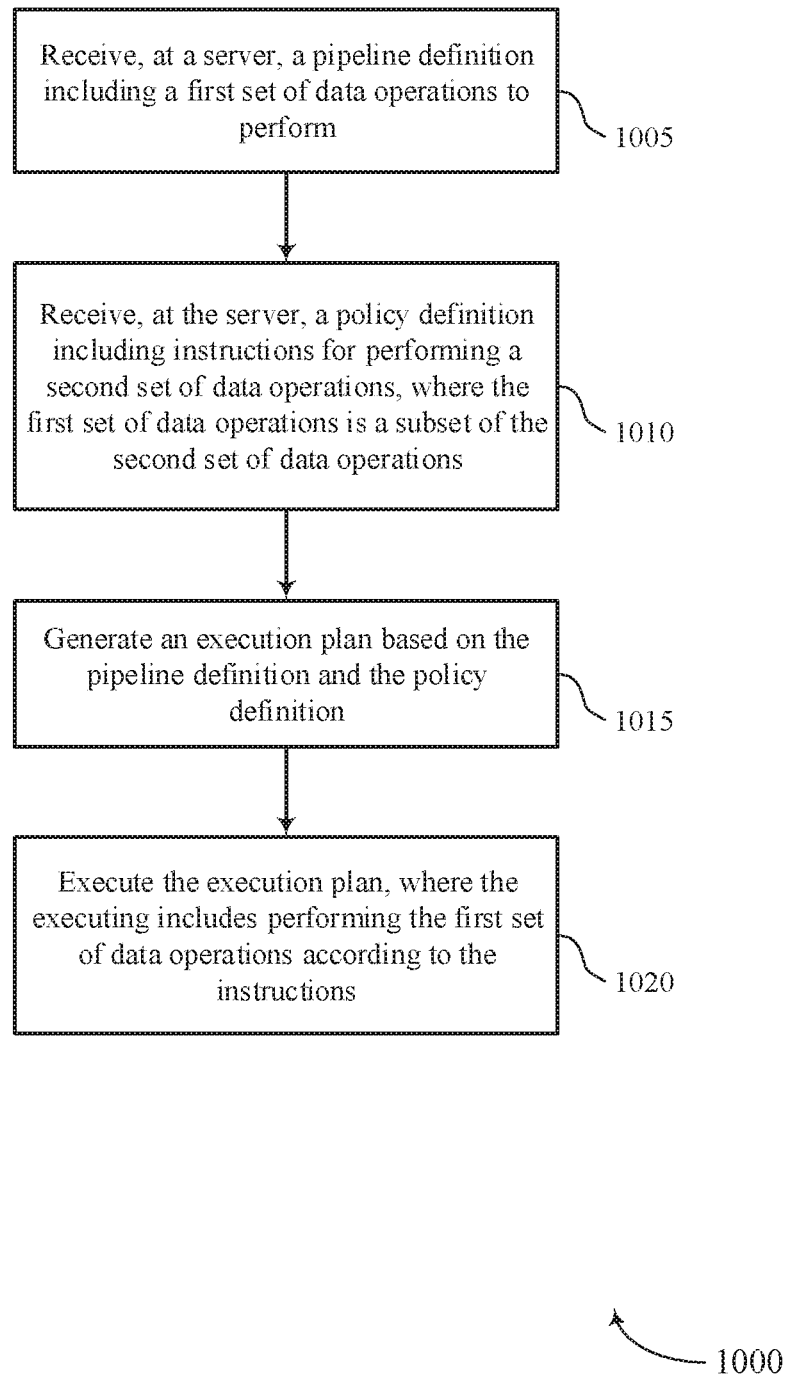
FIGS. 10 through 12 show flowcharts illustrating methods that support policy handling for data pipelines in accordance with aspects of the present disclosure.

FIG. 10 shows a flowchart illustrating a method 1000 that supports policy handling for data pipelines in accordance with aspects of the present disclosure. The operations of method 1000 may be implemented by a server or its components as described herein. For example, the operations of method 1000 may be performed by a data pipeline handling module as described with reference to FIGS. 7 through 9. In some examples, a server may execute a set of instructions to control the functional elements of the server to perform the functions described below. Additionally or alternatively, a server may perform aspects of the functions described below using special-purpose hardware.

At 1005, the server may receive a pipeline definition including a first set of data operations to perform. The operations of 1005 may be performed according to the methods described herein. In some examples, aspects of the operations of 1005 may be performed by a pipeline definition component as described with reference to FIGS. 7 through 9.

At 1010, the server may receive a policy definition including instructions for performing a second set of data operations, where the first set of data operations is a subset of the second set of data operations. The operations of 1010 may be performed according to the methods described herein. In some examples, aspects of the operations of 1010 may be performed by a policy definition component as described with reference to FIGS. 7 through 9.

At 1015, the server may generate an execution plan based on the pipeline definition and the policy definition. The operations of 1015 may be performed according to the methods described herein. In some examples, aspects of the operations of 1015 may be performed by an execution plan generator as described with reference to FIGS. 7 through 9.

At 1020, the server may execute the execution plan, where the executing includes performing the first set of data operations according to the instructions. The operations of 1020 may be performed according to the methods described herein. In some examples, aspects of the operations of 1020 may be performed by a pipeline execution component as described with reference to FIGS. 7 through 9.

Figure 11:
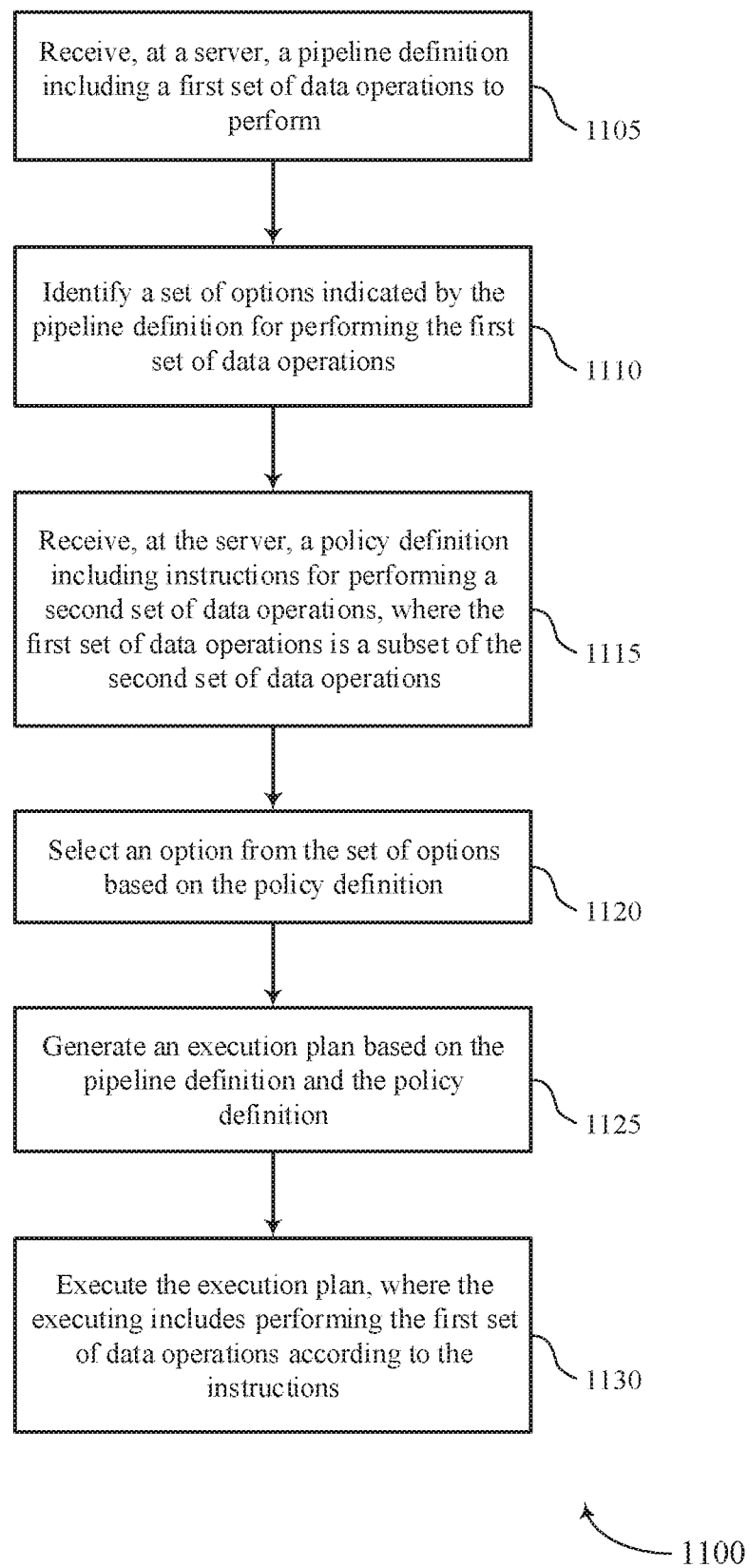

FIG. 11 shows a flowchart illustrating a method 1100 that supports policy handling for data pipelines in accordance with aspects of the present disclosure. The operations of method 1100 may be implemented by a server or its components as described herein. For example, the operations of method 1100 may be performed by a data pipeline handling module as described with reference to FIGS. 7 through 9. In some examples, a server may execute a set of instructions to control the functional elements of the server to perform the functions described below. Additionally or alternatively, a server may perform aspects of the functions described below using special-purpose hardware.

At 1105, the server may receive a pipeline definition including a first set of data operations to perform. The operations of 1105 may be performed according to the methods described herein. In some examples, aspects of the operations of 1105 may be performed by a pipeline definition component as described with reference to FIGS. 7 through 9.

At 1110, the server may identify a set of options indicated by the pipeline definition for performing the first set of data operations. The operations of 1110 may be performed according to the methods described herein. In some examples, aspects of the operations of 1110 may be performed by an execution plan generator as described with reference to FIGS. 7 through 9.

At 1115, the server may receive a policy definition including instructions for performing a second set of data operations, where the first set of data operations is a subset of the second set of data operations. The operations of 1115 may be performed according to the methods described herein. In some examples, aspects of the operations of 1115 may be performed by a policy definition component as described with reference to FIGS. 7 through 9.

At 1120, the server may select an option from the set of options based on the policy definition. The operations of 1120 may be performed according to the methods described herein. In some examples, aspects of the operations of 1120 may be performed by an execution plan generator as described with reference to FIGS. 7 through 9.

At 1125, the server may generate an execution plan based on the pipeline definition and the policy definition. The execution plan may involve the selected option for performing a data operation. The operations of 1125 may be performed according to the methods described herein. In some examples, aspects of the operations of 1125 may be performed by an execution plan generator as described with reference to FIGS. 7 through 9.

At 1130, the server may execute the execution plan, where the executing includes performing the first set of data operations according to the instructions. The operations of 1130 may be performed according to the methods described herein. In some examples, aspects of the operations of 1130 may be performed by a pipeline execution component as described with reference to FIGS. 7 through 9.

Figure 12:
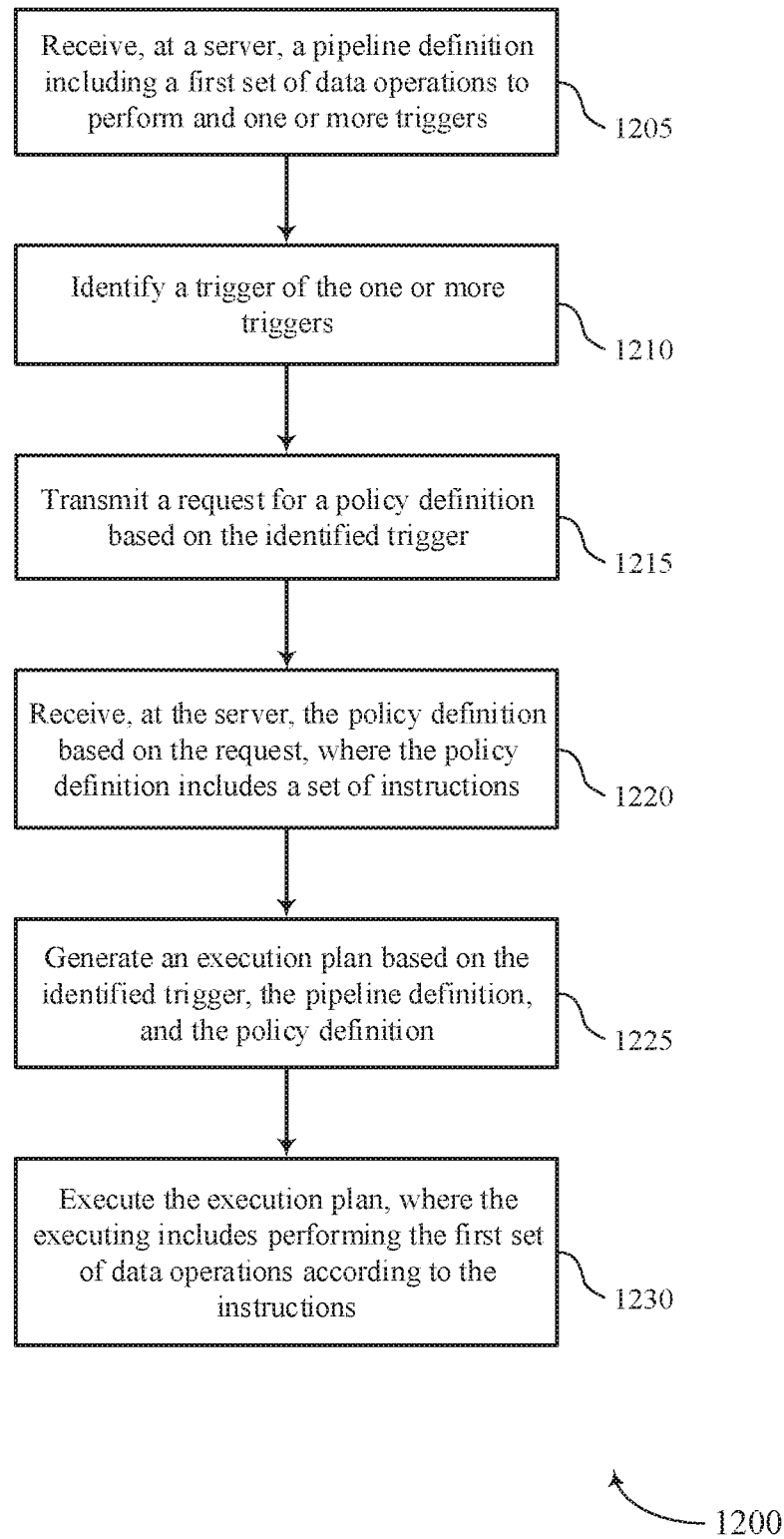

FIG. 12 shows a flowchart illustrating a method 1200 that supports policy handling for data pipelines in accordance with aspects of the present disclosure. The operations of method 1200 may be implemented by a server or its components as described herein. For example, the operations of method 1200 may be performed by a data pipeline handling module as described with reference to FIGS. 7 through 9. In some examples, a server may execute a set of instructions to control the functional elements of the server to perform the functions described below. Additionally or alternatively, a server may perform aspects of the functions described below using special-purpose hardware.

At 1205, the server may receive a pipeline definition including a first set of data operations to perform and an indication of one or more triggers. The operations of 1205 may be performed according to the methods described herein. In some examples, aspects of the operations of 1205 may be performed by a pipeline definition component as described with reference to FIGS. 7 through 9.

At 1210, the server may identify a trigger of the one or more triggers. The operations of 1210 may be performed according to the methods described herein. In some examples, aspects of the operations of 1210 may be performed by a trigger component as described with reference to FIGS. 7 through 9.

At 1215, the server may transmit a request for a policy definition based on the identified trigger. The operations of 1215 may be performed according to the methods described herein. In some examples, aspects of the operations of 1215 may be performed by a trigger component as described with reference to FIGS. 7 through 9.

At 1220, the server may receive the policy definition including instructions for performing a second set of data operations, where the first set of data operations is a subset of the second set of data operations. The policy definition may be received based on the request. The operations of 1220 may be performed according to the methods described herein. In some examples, aspects of the operations of 1220 may be performed by a policy definition component as described with reference to FIGS. 7 through 9.

At 1225, the server may generate an execution plan based on the identified trigger, the pipeline definition, and the policy definition. The operations of 1225 may be performed according to the methods described herein. In some examples, aspects of the operations of 1225 may be performed by an execution plan generator as described with reference to FIGS. 7 through 9.

At 1230, the server may execute the execution plan, where the executing includes performing the first set of data operations according to the instructions. In some cases, the server may execute the execution plan based on the identified trigger. The operations of 1230 may be performed according to the methods described herein. In some examples, aspects of the operations of 1230 may be performed by a pipeline execution component as described with reference to FIGS. 7 through 9.

A method for data pipeline execution at a server is described. The method may include receiving, at the server, a pipeline definition including a first set of data operations to perform, receiving, at the server, a policy definition including instructions for performing a second set of data operations, where the first set of data operations is a subset of the second set of data operations, generating an execution plan based on the pipeline definition and the policy definition, and executing the execution plan, where the executing includes performing the first set of data operations according to the instructions.

An apparatus for data pipeline execution at a server is described. The apparatus may include a processor, memory coupled with the processor, and instructions stored in the memory. The instructions may be executable by the processor to cause the apparatus to receive, at the server, a pipeline definition including a first set of data operations to perform, receive, at the server, a policy definition including instructions for performing a second set of data operations, where the first set of data operations is a subset of the second set of data operations, generate an execution plan based on the pipeline definition and the policy definition, and execute the execution plan, where the executing includes performing the first set of data operations according to the instructions.

Another apparatus for data pipeline execution at a server is described. The apparatus may include means for receiving, at the server, a pipeline definition including a first set of data operations to perform, receiving, at the server, a policy definition including instructions for performing a second set of data operations, where the first set of data operations is a subset of the second set of data operations, generating an execution plan based on the pipeline definition and the policy definition, and executing the execution plan, where the executing includes performing the first set of data operations according to the instructions.

A non-transitory computer-readable medium storing code for data pipeline execution at a server is described. The code may include instructions executable by a processor to receive, at the server, a pipeline definition including a first set of data operations to perform, receive, at the server, a policy definition including instructions for performing a second set of data operations, where the first set of data operations is a subset of the second set of data operations, generate an execution plan based on the pipeline definition and the policy definition, and execute the execution plan, where the executing includes performing the first set of data operations according to the instructions.

In some examples of the method, apparatuses, and non-transitory computer-readable medium described herein, generating the execution plan may include operations, features, means, or instructions for identifying a network device for performing at least one data operation of the first set of data operations based on the pipeline definition and the policy definition.

In some examples of the method, apparatuses, and non-transitory computer-readable medium described herein, the network device may be an example of a first network device and the pipeline definition may indicate a second network device for performing the at least one data operation that is different from the first network device. Some examples of the method, apparatuses, and non-transitory computer-readable medium described herein may further include operations, features, means, or instructions for overriding the indication of the second network device by the pipeline definition based on the policy definition.

Some examples of the method, apparatuses, and non-transitory computer-readable medium described herein may further include operations, features, means, or instructions for determining a network device type indicated by the pipeline definition for performing the at least one data operation, where the network device may be identified based on the network device type indicated by the pipeline definition and the policy definition. In some examples of the method, apparatuses, and non-transitory computer-readable medium described herein, the executing may include operations, features, means, or instructions for running a portion of code on the identified network device based on the execution plan, where the portion of code performs the at least one data operation of the first set of data operations.

In some examples of the method, apparatuses, and non-transitory computer-readable medium described herein, generating the execution plan may include operations, features, means, or instructions for identifying a set of options indicated by the pipeline definition for performing the first set of data operations and selecting an option from the set of options based on the policy definition.

Some examples of the method, apparatuses, and non-transitory computer-readable medium described herein may further include operations, features, means, or instructions for receiving, at the server, an additional policy definition including additional instructions for performing a third set of data operations, where the first set of data operations may be a subset of the third set of data operations, regenerating the execution plan based on the pipeline definition and the additional policy definition, and executing the regenerated execution plan, where the executing the regenerated execution plan includes performing the first set of data operations according to the additional instructions.

In some examples of the method, apparatuses, and non-transitory computer-readable medium described herein, the pipeline definition may be received from a first user device and the policy definition may be received from a second user device different from the first user device.

In some examples of the method, apparatuses, and non-transitory computer-readable medium described herein, the pipeline definition may include one or more triggers and the method, apparatuses, and non-transitory computer-readable medium described herein may further include operations, features, means, or instructions for identifying a trigger of the one or more triggers, where the execution plan may be executed based on the identified trigger. In some examples of the method, apparatuses, and non-transitory computer-readable medium described herein, the execution plan may be generated based on the identified trigger. Some of these examples of the method, apparatuses, and non-transitory computer-readable medium described herein may further include operations, features, means, or instructions for transmitting a request for the policy definition based on the identified trigger, where the policy definition may be received based on the request. In some examples of the method, apparatuses, and non-transitory computer-readable medium described herein, the identified trigger may be an example of a periodic trigger, a data-based trigger, or a combination thereof.

In some examples of the method, apparatuses, and non-transitory computer-readable medium described herein, the instructions may include a data type constraint and the executing may include operations, features, means, or instructions for determining whether data corresponds to a data type of the data type constraint and extracting the data if the data is determined to correspond to the data type of the data type constraint. In some examples of the method, apparatuses, and non-transitory computer-readable medium described herein, the instructions may include a data storage constraint, the generating the execution plan includes identifying a data storage system corresponding to the data storage constraint, and the executing includes storing data in the data storage system based on the execution plan. In some examples of the method, apparatuses, and non-transitory computer-readable medium described herein, the instructions may include a resource constraint for execution and the executing may include operations, features, means, or instructions for halting the executing based on a resource usage for the executing meeting or exceeding the resource constraint.

In some examples of the method, apparatuses, and non-transitory computer-readable medium described herein, the executing may include operations, features, means, or instructions for performing a set of data operations of the first set of data operations in sequence, in parallel, or in a combination thereof based on the pipeline definition.

In some examples of the method, apparatuses, and non-transitory computer-readable medium described herein, the first set of data operations includes monitoring for data, transforming data, processing data, extracting data, loading data, or a combination thereof. In some examples of the method, apparatuses, and non-transitory computer-readable medium described herein, the first set of data operations and the second set of data operations may be the same.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data pipeline execution at a server, comprising:
   receiving, at the server, a pipeline definition comprising a first set of data operations to perform, the pipeline definition indicating a first network device for performing at least one data operation of the first set of data operations;
   receiving, at the server, a policy definition comprising instructions for performing a second set of data operations, wherein the first set of data operations is a subset of the second set of data operations;
   overriding the first network device indicated by the pipeline definition based at least in part on the policy definition;
   identifying a second network device different from the first network device for performing the at least one data operation based at least in part on the pipeline definition and the policy definition;
   generating an execution plan based at least in part on the identified second network device, the pipeline definition, and the policy definition; and
   executing the execution plan, wherein the executing comprises performing the first set of data operations according to the instructions.

2. The method of claim 1, further comprising:
   determining a network device type indicated by the pipeline definition for performing the at least one data operation, wherein the second network device is identified based at least in part on the network device type indicated by the pipeline definition and the policy definition.

3. The method of claim 1, wherein the executing comprises:
   running a portion of code on the identified second network device based at least in part on the execution plan, wherein the portion of code performs the at least one data operation of the first set of data operations.

4. The method of claim 1, wherein generating the execution plan comprises:
   identifying a set of options indicated by the pipeline definition for performing the first set of data operations; and
   selecting an option from the set of options based at least in part on the policy definition.

5. The method of claim 1, further comprising:
   receiving, at the server, an additional policy definition comprising additional instructions for performing a third set of data operations, wherein the first set of data operations is a subset of the third set of data operations;
   regenerating the execution plan based at least in part on the pipeline definition and the additional policy definition; and
   executing the regenerated execution plan, wherein the executing the regenerated execution plan comprises performing the first set of data operations according to the additional instructions.

6. The method of claim 1, wherein:
   the pipeline definition is received from a first user device; and
   the policy definition is received from a second user device different from the first user device.

7. The method of claim 1, wherein the pipeline definition comprises one or more triggers, the method further comprising:
   identifying a trigger of the one or more triggers, wherein the execution plan is executed based at least in part on the identified trigger.

8. The method of claim 7, wherein the execution plan is generated based at least in part on the identified trigger, the method further comprising:
   transmitting a request for the policy definition based at least in part on the identified trigger, wherein the policy definition is received based at least in part on the request.

9. The method of claim 7, wherein the identified trigger comprises a periodic trigger, a data-based trigger, or a combination thereof.

10. The method of claim 1, wherein the instructions comprise a data type constraint and wherein the executing comprises:
    determining whether data corresponds to a data type of the data type constraint; and
    extracting the data if the data is determined to correspond to the data type of the data type constraint.

11. The method of claim 1, wherein:
    the instructions comprise a data storage constraint;
    the generating the execution plan comprises identifying a data storage system corresponding to the data storage constraint; and
    the executing comprises storing data in the data storage system based at least in part on the execution plan.

12. The method of claim 1, wherein the instructions comprise a resource constraint for execution and wherein the executing comprises:
    halting the executing based at least in part on a resource usage for the executing meeting or exceeding the resource constraint.

13. The method of claim 1, wherein the executing comprises:
    performing a plurality of data operations of the first set of data operations in sequence, in parallel, or in a combination thereof based at least in part on the pipeline definition.

14. The method of claim 1, wherein the first set of data operations comprises monitoring for data, transforming data, processing data, extracting data, loading data, or a combination thereof.

15. An apparatus for data pipeline execution at a server, comprising:
    a processor;
    memory coupled with the processor; and
    instructions stored in the memory and executable by the processor to cause the apparatus to:
       receive, at the server, a pipeline definition comprising a first set of data operations to perform, the pipeline definition indicating a first network device for performing at least one data operation of the first set of data operations;
       receive, at the server, a policy definition comprising policy instructions for performing a second set of data operations, wherein the first set of data operations is a subset of the second set of data operations;
       override the first network device indicated by the pipeline definition based at least in part on the policy definition;
       identify a second network device different from the first network device for performing the at least one data operation based at least in part on the pipeline definition and the policy definition;

generate an execution plan based at least in part on the identified second network device, the pipeline definition, and the policy definition; and execute the execution plan, wherein the executing comprises performing the first set of data operations according to the policy instructions.

16. A non-transitory computer-readable medium storing code for data pipeline execution at a server, the code comprising instructions executable by a processor to:

receive, at the server, a pipeline definition comprising a first set of data operations to perform, the pipeline definition indicating a first network device for performing at least one data operation of the first set of data operations;

receive, at the server, a policy definition comprising policy instructions for performing a second set of data operations, wherein the first set of data operations is a subset of the second set of data operations;

override the first network device indicated by the pipeline definition based at least in part on the policy definition;

identify a second network device different from the first network device for performing the at least one data operation based at least in part on the pipeline definition and the policy definition;

generate an execution plan based at least in part on the identified second network device, the pipeline definition, and the policy definition; and execute the execution plan, wherein the executing comprises performing the first set of data operations according to the policy instructions.

* * * * *